(No Model.)
G. D. HOLT.
CONDUIT FOR ELECTRICAL CONDUCTORS.
No. 374,792. Patented Dec. 13, 1887.
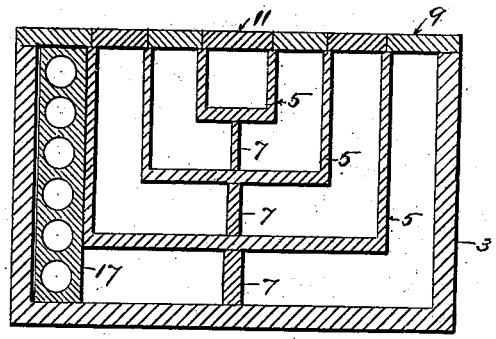
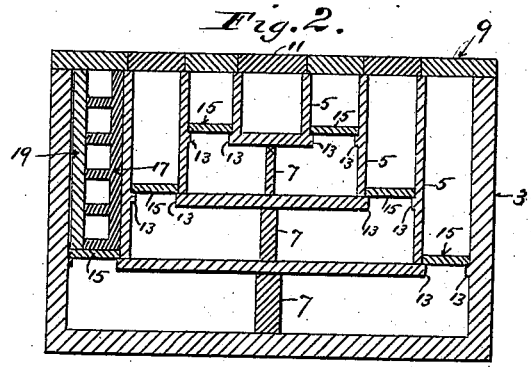
Witnesses
R. H. Sanford
S. J. Beardsley
Inventor
George D. Holt
By A. C. Paul atty

UNITED STATES PATENT OFFICE.

GEORGE D. HOLT, OF MINNEAPOLIS, MINNESOTA, ASSIGNOR OF ONE-HALF TO SAMUEL POTTS, OF SAME PLACE.

CONDUIT FOR ELECTRICAL CONDUCTORS.

SPECIFICATION forming part of Letters Patent No. 374,792, dated December 13, 1887.

Application filed August 20, 1887. Serial No. 247,442. (No model.)

*To all whom it may concern:*

Be it known that I, GEORGE D. HOLT, of Minneapolis, in the county of Hennepin and State of Minnesota, have invented certain Improvements in Conduits for Electrical Conductors, of which the following is a specification.

The object of my invention is to provide an inexpensive conduit system comprising a series of independent conduits which are easily accessible and which occupy only a small amount of space.

The invention consists, generally, in a series of conduits progressively smaller in size, and arranged one within another and provided with openings at their tops, permitting access to any conduit.

The invention consists, further, in the construction and combination hereinafter described, and pointed out in the claims.

In the accompanying drawings, forming a part of this specification, Figure 1 is a transverse vertical section of a series of conduits embodying my invention. Fig. 2 is a similar view showing horizontal partitions dividing the conduits into separate compartments.

In the drawings, 3 represents a suitable trough-shaped conduit, preferably rectangular in cross-section, and preferably formed ot wood, though other suitable form or material may be used instead. In this conduit is arranged a series of other conduits, 5, preferably similar to the conduit 3, and each somewhat smaller than the next surrounding conduit, whereby a narrow space is left between each conduit and the next conduit of the series. Each conduit is supported, preferably, by suitable supports, 7, from the next outer conduit. The size of the spaces between the bottoms of the conduits is determined by the size of the blocks or supports 7. The tops of the conduits are preferably and substantially all on the same level, and I prefer to provide a series of covers, 9, each covering the space between the walls of two of the conduits, and a similar cover, 11, for the central conduit.

I may provide projections or lugs 13 on the walls of the conduits, and place horizontal division boards or plates 15 thereon to divide the space in each conduit into separate compartments. In this case access can be had to the lower compartment only by removing the conductors from the upper compartment and the division-boards, or through the usual junction-boxes.

The outer conduit may be formed of metal, stone, brick, or cement, and the inner conduits of wood; or the outer conduit may be formed of thick wooden planks and the inner ones of thinner planks or boards.

Access to any conduit may be had by removing its cover without disturbing the other conduits.

In some instances I prefer to provide the conduit with an independent series of ducts or compartments, 17, which may be formed of tiling or other suitable material, and be adapted to fit into the space between the walls of two of the conduits, as shown in Fig. 1. If preferred, these ducts may be formed opened at one side, as shown in Fig. 2, and provided with a plate, 19, by which all of them may be closed. Access may be had to the ducts by removing the plate 19, for the purpose of putting the wires into or removing them from the ducts.

I claim as my invention—

1. A series of conduits for electric conductors, progressively smaller in cross-section, and arranged one within another throughout the series, substantially as described.

2. A series of conduits for electric conductors, progressively smaller in cross-section, and arranged one within another throughout the series, in combination with supports between each conduit and the next outer conduit of the series.

3. A series of conduits for electric conductors, progressively smaller in cross-section, and arranged one within another throughout the series, with their tops on substantially the same level, and independent covers over the center conduit and over the several spaces between the walls of the conduits, substantially as described.

4. A series of independent conduits for electric conductors, progressively smaller in cross-section, and arranged one within another throughout the series and provided with the lugs or projections 13, and the removable partitions 15, resting on said lugs, substantially as described.

5. A series of conduits for electric conductors, progressively smaller in cross-section, and arranged one within another throughout the series, in combination with an independent series of ducts or compartments arranged in the spaces between the conduits of larger and smaller size, substantially as described.

In testimony whereof I have hereunto set my hand this 16th day of August, 1887.

GEORGE D. HOLT.

In presence of—
 R. H. SANFORD,
 A. M. GASKELL.